C. H. OTIS.
KEY RING CHAIN.
APPLICATION FILED JULY 22, 1920.
1,380,244.  
Patented May 31, 1921.
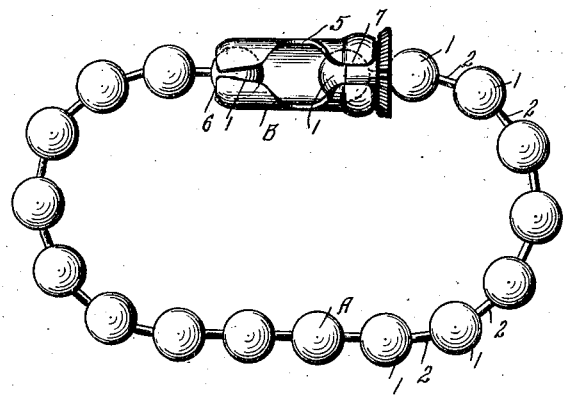
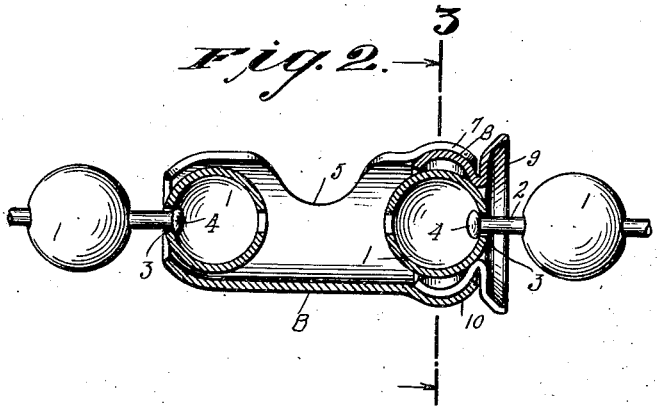
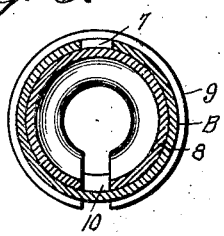
WITNESSES  
H. C. Hebig  
S. W. Foster
INVENTOR  
C. H. OTIS  
BY  
ATTORNEYS

UNITED STATES PATENT OFFICE.

CHARLES H. OTIS, OF ORANGE, CONNECTICUT.

KEY-RING CHAIN.

1,380,244. Specification of Letters Patent. Patented May 31, 1921.

Application filed July 22, 1920. Serial No. 398,104.

*To all whom it may concern:*

Be it known that I, CHARLES H. OTIS, a citizen of the United States, and a resident of Orange, in the county of New Haven and State of Connecticut, have invented a new and Improved Key-Ring Chain, of which the following is a full, clear, and exact description.

This invention relates to improvements in key ring chains, an object of the invention being to provide a chain of improved construction and improved coupling means for holding the ends of the chain together.

A further object is to provide an improved construction of coupling device which is primarily adapted for use on key ring chains, but which also can be conveniently used on various types of chains or other articles.

With these and other objects in view the invention consists in certain novel features of construction, and combinations and arrangements of parts, as will be more fully hereinafter described and pointed out in the claims.

In the accompanying drawings—

Figure 1 is a plan view illustrating my improved key ring chain.

Fig. 2 is an enlarged view in longitudinal section in the coupling.

Fig. 3 is a view in transverse section on the line 3—3 of Fig. 2 with the ball or bead omitted.

A represents the chain and B the coupling member of my improved key ring chain. The chain A is preferably composed of a series of hollow spherical balls or beads 1 connected by links 2. The links 2 preferably constitute short sections of rod projected through openings 3 in the balls or beads 1 and having their ends enlarged, as shown at 4, to securely couple the parts together.

The coupling member B comprises a sleeve which is formed preferably of a single sheet of metal bent into general cylindrical shape and provided intermediate its ends with a relatively large opening or entrance 5 for the accommodation of an end ball or bead 1. The sleeve or coupling B at one end is smaller than the other end, or, in other words, the two ends of the metal sheet forming the sleeve are brought close together, as shown at 6, so as to prevent the disconnection of one end ball of the chain.

The other end of the sleeve B is made with a slot 7 through which a link 2 may be moved. In this slotted end of the sleeve B a thimble 8 has rotary mounting and the thimble and the end of the sleeve are preferably curved, or, in other words, are of somewhat spherical shape so as to securely hold the thimble in the end of the sleeve, but permit its rotary movement, and a milled finger hold 9 is provided on the outer end of the thimble to turn the same. This thimble 8 is made with a slot 10 which is adapted to register with the slot 7 of the sleeve B to permit coupling or uncoupling of one end of the chain with the sleeve.

The operation is as follows: With the parts as shown in Fig. 1, the ends of the chain are securely coupled and when it is desired to uncouple, it is simply necessary to turn the thimble 8 to register the slot 10 of the thimble with the slot 7 of the sleeve. These slots 7 and 10 will then accommodate the end link 2 so that said link can be moved through the slots to bring the end ball or bead 1 into position for removal through the opening or entrance 5. To couple, it is simply necessary to return the ball or bead through the entrance 5 and move the end link 2 through the slots 7 and 10 and then turn the thimble 8 to move its slot 10 out of register with the slot 7 so that the parts will be effectually coupled.

While I have described my invention as a key ring chain, it is obvious that it may be adapted for many other uses, and particularly the coupling means, which may be utilized in connection with necklaces, chains, bracelets, and other articles.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A device of the character described, comprising a coupling sleeve having an entrance in its side wall, a slot extending from said entrance to one end of the sleeve, a thimble having rotary mounting in the slotted end of the sleeve and having a slot adapted to register with the first-mentioned slot, and a coupling member comprising an enlargement and a restricted portion, said enlargement adapted to be moved through the said entrance, and said restricted portion adapted to be moved through said slots when the latter are in register, and said parts locked together when the thimble is turned to position the slots out of register.

2. A device of the character described, comprising a coupling sleeve having an entrance in its side wall, a slot extending from said entrance to one end of the sleeve, a thimble having rotary mounting in the slotted end of the sleeve and having a slot adapted to register with the first-mentioned slot, and a coupling member comprising an enlargement and a restricted portion, said enlargement adapted to be moved through the said entrance, and said restricted portion adapted to be moved through said slots when the latter are in register, and said parts locked together when the thimble is turned to position the slots out of register, said thimble and enlargement being of general spherical shape.

3. A device of the character described, comprising a coupling sleeve having an entrance in its side wall, a slot extending from said entrance to one end of the sleeve, a thimble having rotary mounting in the slotted end of the sleeve and having a slot adapted to register with the first-mentioned slot, a coupling member comprising an enlargement and a restricted portion, said enlargement adapted to be moved through the said entrance, and said restricted portion adapted to be moved through said slots when the latter are in register, and said parts locked together when the thimble is turned to position the slots out of register, and a finger hold on the outer end of the thimble.

4. A key ring chain, comprising a series of spherical balls or beads, links of relatively small diameter connecting the balls or beads, a coupling sleeve having an opening or entrance intermediate its ends and adapted to permanently hold the end ball in one end of the sleeve, said sleeve at its other end having a longitudinal slot of a width sufficient to accommodate a link, a thimble mounted in the slotted end of the sleeve and having a slot therein adapted to register with the first-mentioned slot, and an enlargement on the outer end of the thimble.

CHARLES H. OTIS.